United States Patent [19]

Sato

[11] Patent Number: 4,895,343

[45] Date of Patent: Jan. 23, 1990

[54] APPARATUS FOR DRIVING A THROTTLE VALVE

[75] Inventor: Makoto Sato, Wako, Japan

[73] Assignee: Honda Giken Kogyo Kabushiki Kaisha, Tokyo, Japan

[21] Appl. No.: 322,853

[22] Filed: Mar. 14, 1989

[30] Foreign Application Priority Data

Mar. 14, 1988 [JP] Japan .................................. 63-59990

[51] Int. Cl.$^{4}$ .......................... F16K 31/04; F02D 9/02

[52] U.S. Cl. ................................ 251/129.03; 123/396; 123/399

[58] Field of Search .................... 251/129.03; 123/396, 123/399, 400

[56] References Cited

U.S. PATENT DOCUMENTS 4,548,176 10/1985 Ishida et al. .................... 123/396 X 4,785,782 11/1988 Tanaka et al. ...................... 123/399

*Primary Examiner*—Arnold Rosenthal

*Attorney, Agent, or Firm*—Armstrong, Nikaido, Marmelstein, Kubovcik & Murray

[57] ABSTRACT

A throttle shaft provided with a throttle valve is rotatably supported on a support body and urged by a spring in a direction of closing the throttle valve. An electric driving device is connected to the throttle shaft to drive the shaft when energized and arranged so that when electric power is deenergized, connection to the throttle valve is released. A connecting member is connected to the throttle valve such that no displacement in relative angle therebetween can occur. A lever is connected to a manual operating member and is mounted such that a displacement in relative angle with the throttle shaft can occur. The lever is urged by a spring in a direction of closing the throttle valve. Stoppers are provided on the support body so as to define an angular displacement of the lever and of the connecting member on the side on which the throttle valve is closed. An electric connection device connects the connecting member and lever in the same phase when electric power is deenergized thereto and release the connected state therebetween when electric power is energized. Thereby, in the normal state, the throttle valve can be electrically controlled, and when an electric failure occurs, the throttle valve can be mechanically rotatively driven by connection between the lever and the connecting member.

9 Claims, 2 Drawing Sheets

APPARATUS FOR DRIVING A THROTTLE VALVE

BACKGROUND OF THE INVENTION

The present invention relates to an apparatus for operating a throttle valve.

In passenger cars, with the development and use of autocruise devices, driving force control devices, idle control devices and the like, the necessity of electrically controlling the degree of opening of a throttle valve has increased. In the past, the throttle valve and an accelerator pedal were mechanically connected by a wire or the like so that when the vehicle was being normally driven, the degree of opening of the throttle was mechanically controlled by the accelerator pedal, and when necessary, the degree of opening of the throttle was controlled by an electric motor or a vacuum servo device.

However, if the amount that the accelerator pedal is depressed is electrically detected and the throttle valve is electrically operated according to the detected amount, more accurate control can be obtained, which is rational. Such system as just mentioned has been already proposed. However, in this proposal in which the degree of opening of the throttle is always electrically controlled, if any special back-up mechanism is not provided, the control of the degree of opening of the throttle would be rendered impossible at the time of occurrence of an electric failure.

SUMMARY OF THE INVENTION

The present invention has been achieved in view of the foregoing. An object of the present invention is to provide an apparatus for operating a throttle valve in which normally, the throttle valve is electrically driven and when an electrical failure occurs, the throttle valve is mechanically driven.

For achieving the aforesaid object, according to the present invention, an apparatus is provided for driving a throttle valve comprising a throttle shaft provided with the throttle valve, the throttle shaft being rotatably supported on a support body and being urged by a spring in a direction of closing the throttle valve, electric driving means connected to the throttle shaft for electrically driving the shaft when energized and arranged so that when electric power is deenergized, connection to the throttle valve is released, a connecting member connected to the throttle valve such that no displacement in relative angle therebetween can occur, a lever connected to a manual operating member and mounted such that a displacement in relative angle with the throttle shaft can occur, the lever being urged by a spring in a direction of closing the throttle valve, stoppers provided on the support body so as to define an angular displacement of the lever and of the connecting member on the side on which the throttle valve is closed, and electric connection means for connecting the connecting member and lever in the same phase when electric power is deenergized and release the connected state therebetween when electric power is energized.

According to the above-described structure, in the normal state, the throttle shaft can be rotated to operate the throttle valve by the electric driving means. When an electrical failure occurs, the connecting member continues its rotation toward closing of the throttle till the member comes into contact with one of the stoppers and the lever is also rotated upon ceasing the operation of the manual operating member toward closing of the throttle till the lever comes into contact with the other stopper. When the connecting member and the lever assume the same phase, the connecting member and the lever are connected by the deenergization of power of the electric connection means. Accordingly, the lever can then by driven by operation of the manual operating member whereby the throttle shaft, that is, the throttle valve can be driven.

BRIEF DESCRIPTION OF THE DRAWINGS

The above and other objects, features and advantages of the present invention will become apparent from the ensuing detailed description of the preferred embodiments in connection with the accompanying drawings wherein.

DESCRIPTION OF THE PREFERRED EMBODIMENTS

Figure 1:
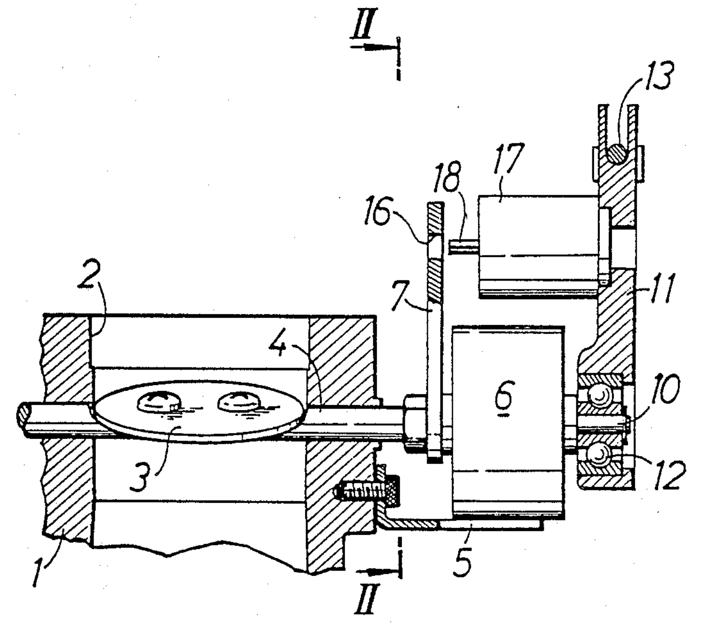
FIGS. 1 and 2 show a first embodiment of the present invention, FIG. 1 being a longitudinal sectional side view of the first embodiment, and FIG. 2 being a sectional view taken on line II—II of FIG. 1.
Figure 2:
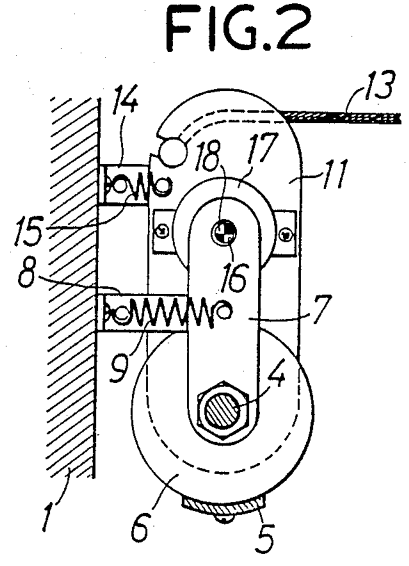

Embodiments of the present invention will be described thereinafter with reference to the drawings. Referring first to FIGS. 1 and 2 which show a first embodiment of the present invention, a throttle valve 3 for controlling a degree of opening an intake passage 2 formed within a support body 1 such as a throttle body is fixedly mounted on a throttle shaft 4 rotatably supported on the support body 1.

A bracket 5 is fixedly mounted on the outer surface of the support body 1. A DC motor 6 as electric driving means is secured to the bracket 5. This DC motor 6 is connected to the throttle shaft 4 projected from the support body 1 so as to render the throttle shaft 4 freely rotatable when electric power is deenergized. This electric driving means may be a stepping motor connected to the throttle shaft 4 through an electromagnetic clutch or a rotary linear solenoid or the like. A base end of a connection member 7 extending in a single radial direction of the throttle shaft 4 is fixedly mounted to the throttle shaft 4, the connection member 7 being rotated together with the throttle shaft 4 and thus, the throttle valve 3. Moreover, a stopper 8 with which the connection member 7 comes into contact when the throttle valve 3 is fully closed is fixedly mounted on the outer surface of the support body 1. A spring 9 for urging the throttle valve 3 in a direction of closing is interposed between the stopper 8 and the connection member 7.

On the side of the DC motor 6 opposite the throttle shaft 4, a support shaft 10 is projected coaxial with the throttle shaft 4. A base end of a lever 11 is rotatably supported on the support shaft 10 through a bearing 12. One end of a throttle wire 13 as a manual operating member is connected to the lever 11, the other end of the throttle wire 13 being connected to an accelerator pedal (not shown). Accordingly, the lever 11 is rotated in a direction of opening the throttle valve 3 about the same axis as that of the throttle shaft 4 upon pressing down on the accelerator pedal.

A stopper 14 for defining rotation of the lever 11 in a direction of closing the throttle valve is projected from the outer surface of the support body 1. The lever 11 having been rotated to a fully closed position the contacts stopper 14. A spring 15 is interposed between the stopper 14 and the lever 11. The lever 11 is rotatively urged by the force of the spring 15 in a direction of contacting the stopper, that is, in a direction of closing the valve.

The connection member 7 has a connection hole 16 bored in its free end. A solenoid 17 as electric connection means is secured to the lever 11 and is provided with an engaging pin 18 insertable into and engageable with the connection hole 16. The solenoid 17 causes the engaging pin 18 to be contracted when the solenoid is energized by electric power while the engaging pin 18 is extended when electric power is deenergized so that the pin may be inserted into and engaged with the connection hole 16. When the connection member 7 is in contact with the stopper 8, the lever 11 comes into contact with the stopper 14 so that they are in the state of the same phase, the engaging pin 18 is positioned and locked to the lever 11 so as to be inserted into the connection hole 16.

The function of the above-described embodiment will be described. In the normal driving state, the amount that the accelerator pedal is depressed is electrically detected, and the DC motor 6 is activated according to the detected amount whereby the throttle valve 3 is driven to a degree of opening according to the amount of activation of the DC motor 6. At that time, the lever 11 is also driven by the throttle wire 13 according to the pressing of the accelerator pedal, but since the solenoid 17 is also energized, the connection member 7 and the lever 11 are in a released state of connection and the lever 11 is merley rotated about the support shaft 10.

It is assumed that a failure occurs in an electric circuit. The DC motor 6 and the solenoid 17 are deenergized due to the failure, and the connection member 7 and the throttle shaft 4 rotate till the connection member 7 comes into contact with the stopper 8 due to the force of the spring 9, as a result of which the throttle valve 3 assumes its fully closed state. At that time, when the accelerator pedal is released by the foot, the lever 11 rotates till the lever 11 comes into contact with the stopper 14 by the force of the spring 15 to assume the same phase as that of the connection member 7. The engaging pin 18 extends because of the deenergization of the solenoid 17 and is inserted into the connection hole 16. In this manner, the connection member 7 and the lever 11 are directly connected with each other. Then when the accelerator pedal is again pressed so that the lever 11 is driven by the throttle wire 13, the connection member 7 being connected to the lever 11 is also driven, and the throttle valve 3 is mechanically rotatively driven through the throttle shaft 4.

Figure 3:
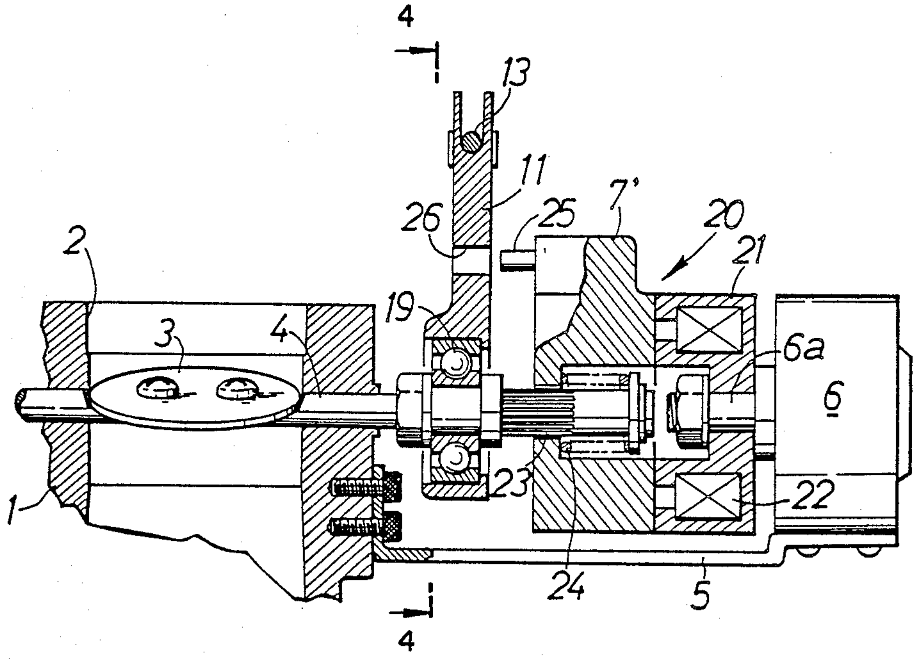
FIGS. 3 and 4 show a second embodiment of the present invention, FIG. 3 being a longitudinal sectional side view of the second embodiment, and FIG. 4 being a sectional view taken on line IV—IV of FIG. 3.
Figure 4:
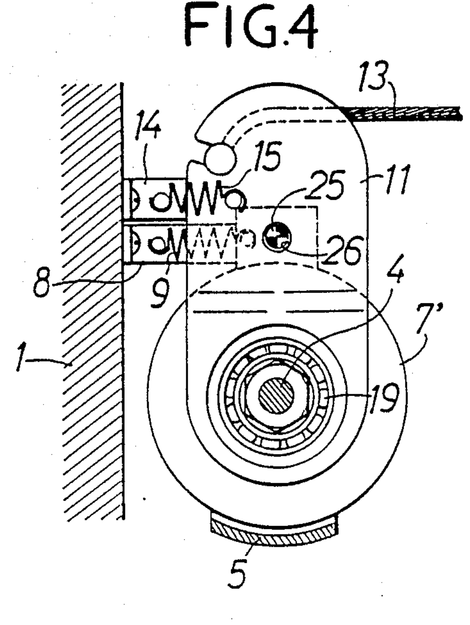

FIGS. 3 and 4 show a second embodiment of the present invention. Parts corresponding to those shown in the abovedescribed first embodiment are indicated by the same reference numerals.

The lever 11 which is connected the throttle wire 13 has a base end which is relatively rotatably supported on the throttle shaft 4. The throttle shaft 4 is connected to an output shaft A of the DC motor 6 through an electromagnetic clutch 20 as electric connection means. The electromagnetic clutch 20 is composed of a rotary body 21 secured to the output shaft 6*a* of the DC motor 6, a solenoid 22 disposed on the rotary body 21, ac connection member 7′ as a clutch plate connected to the throttle shaft 4 through a spline 23 between the rotary body 21 and the lever 11, and a spring 24 for elastically urging the connection member 7′ in a direction of moving away from the rotary body 21, that is, toward the lever 11. When the solenoid 22 is energized, the connection member 7′ is attracted toward the rotary body 21 against the elastic force of the spring 24 so that the connection member 7′ non-relatively rotatably connected with the throttle shaft 4 comes into frictional contact with the rotary body 21 secured to the output shaft 6*a* of the DC motor 6, whereby the driving force of the DC motor 6 is transmitted to the throttle shaft 4. On the other hand, when the solenoid 22 is deenergized, the connection member 7′ moves away from the rotary body 21 by the force of the spring 24 to release the connected state between the rotary body 21 and the connection member 7′.

An engaging pin 25 projects from the surface of the connection member 7′ opposite to the lever 11. The lever 11 has a connection hole 26 bored therein into which the engaging pin 25 can be inserted and engaged according to the movement of the connection member 7′ close to the lever 11. The engaging pin 25 and the connection hole 26 are disposed so as to be coaxial with each other when the connection member 7′ and the lever 11 come into contact with the stoppers 8 and 14 to assume the same phase.

Also in the second embodiment, when the DC motor 6 and the solenoid 22 are deenergized, the connection member 7′ and the lever 11 are connected with each other by returning the throttle wire 13 to its original position, and the throttle valve 3 can be mechanically rotatively driven.

While in the above-described first embodiment as well as the second embodiment, the solenoid 17 and magnetic clutch 20 as the electric connection means are operated in the state wherein the throttle wire 13 is returned to its original position, it is to be noted that the provision of detection means such as a microswitch on the stopper 14 is required in order to detect the aforesaid state. In order to eliminate the provision of such detection means, the sides of the connection member 7 and lever 11 on the sides of the solenoid 17 and electromagnetic clutch 2 may be inclined. That is, in case of the connection member 7, the surface opposed to the solenoid 17 rightward of the connection hole 16 in FIG. 2, and in the case of the lever 11, the surface opposed to the electromagnetic clutch 20 rightward of the connection hole 26 in FIG. 4, may be respectively inclined or slanted so that the surfaces come closer to the solenoid 17 and electromagnetic clutch 20 nearer to the connection holes 16 and 26. With this arrangement, even if the engaging pins 18 and 25 are fully extended before the lever 11 comes into contact with the stopper 14, the end surfaces of the engaging pins 18 and 25 can be guided to the connection holes 16 and 26 by sliding in contact with the connection member 7 and the lever 11.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for driving a throttle valve, comprising a throttle shaft provided with the throttle valve, the throttle shaft being rotatably supported on a support body and being urged by a spring in a direction of closing the throttle valve, electric driving means connected to the throttle shaft for electrically driving said shaft when energized and arranged so that when electric power is deenergized, connection to the throttle valve is released, a connecting member connected to the throttle valve such that no displacement in relative angle therebetween can occur, a lever connected to a manual operating member and mounted such that a displacement in relative angle with the throttle shaft can occur, said lever urged by another spring in a direction of closing the throttle valve, stoppers provided on the support body so as to define an angular displacement of the lever and of the connecting member on the side on which the throttle valve is closed, and electric connection means for connecting the connecting member and lever in the same phase when electric power is deenergized and releasing the connected state therebetween when electric power is energized.

2. An apparatus for driving a throttle valve according to claim 1, wherein said connecting member extends in a radial direction of said throttle shaft, and a base end of said connecting member is secured to the throttle shaft.

3. An apparatus for driving a throttle valve according to claim 2, wherein said connecting member has a connection hole bored in a free end thereof.

4. An apparatus for driving a throttle valve according to claim 3, wherein said electric connection means comprises a solenoid, said solenoid being secured to said lever and having an engaging pin engageable with said connection.

5. An apparatus for driving a throttle valve according to claim 4, wherein said engaging pin is contracted when electric power is energized to said solenoid and said engaging pin is projected when electric power is deenergized to said solenoid so that the pin is inserted into and engaged with said connection hole.

6. An apparatus for driving a throttle valve according to claim 1, wherein said electric connection means comprises an electromagnetic clutch, and said electromagnetic clutch comprises a rotary body connected to said electric driving means, a solenoid disposed on said rotary body, a clutching surface defined on said connecting member engageable by said rotary body, and a clutch spring for elastically urging said connecting member toward the lever, said connecting member being connected to the throttle shaft through a spline between said rotary body and said lever.

7. An apparatus for driving a throttle valve according to claim 6, wherein said connecting member is attracted toward said rotary body against the elastic force of said clutch spring when electric power in energized to said solenoid whereby said connecting member and said rotary body are connected by contact of said clutching surface and said rotary body.

8. An apparatus for driving a throttle valve according to claim 7, wherein said connecting member is attracted toward said connecting member is moved away from said rotary body by the elastic force of said clutch spring when said solenoid is deenergized whereby the connected state between said connecting member and said rotary body is released.

9. An apparatus for driving a throttle valve according to claim 7, wherein an engaging pin projects on the surface of said connecting member opposite to said lever, and said lever has a connection hole bored therein capable of receiving and engaging the engaging pin according to an approaching movement of said connecting member close to the lever.

* * * * *